United States Patent [19]

Inamine et al.

[11] 4,168,323

[45] Sep. 18, 1979

[54] FOOD ADDITIVE COMPOSITION AND PROCESS FOR PREPARATION THEREOF

[75] Inventors: Shigeo Inamine, Kobe; Toshio Matsuda, Itami; Takeo Shimomura, Nishinomiya, all of Japan

[73] Assignee: Kabushiki Kaisha Veno Seiyako Oyo Kenkyujo, Osaka, Japan

[21] Appl. No.: 801,320

[22] Filed: May 27, 1977

[30] Foreign Application Priority Data

Jun. 1, 1976 [JP] Japan .................................. 51-62930
Apr. 22, 1977 [JP] Japan .................................. 52-45917

[51] Int. Cl.² ........................ A23L 1/272; A23L 1/325
[52] U.S. Cl. ..................................... 426/268; 426/103; 426/307; 426/332; 426/643; 426/654
[58] Field of Search ............... 426/103, 290, 613, 651, 426/654, 659, 268, 307, 332, 643, 658

[56] References Cited

U.S. PATENT DOCUMENTS

| 2,046,567 | 7/1936 | Lund ..................................... 426/658 |
| 2,566,410 | 9/1951 | Griffin ............................. 426/651 X |
| 2,904,440 | 9/1959 | Dimick et al. .................... 426/658 X |
| 2,920,723 | 3/1960 | Schulz et al. ..................... 426/651 X |
| 2,929,722 | 3/1960 | Schultz et al. ................... 426/651 X |
| 3,514,298 | 5/1970 | Noznick et al. .................. 426/613 X |
| 3,764,346 | 10/1973 | Noznick et al. ..................... 426/651 |

*Primary Examiner*—Robert A. Yoncoskie
*Attorney, Agent, or Firm*—Sherman & Shalloway

[57] ABSTRACT

A food additive composition admixed with fish mince consisting of a hydrophilic powdery colloidal solid having a particle size smaller than 20 mesh and comprising 60 to 99% of a sugar alcohol or a sugar, 30 to 0.5% of a food-grade surface-active agent and 30 to 0% of an edible oil or fat. The food additive can be prepared by adding a food-grade surface-active agent and an oil or fat to a melt or aqueous solution of a sugar alcohol or a sugar to dissolve them or disperse them in a fine particlar form, optionally adding a sugar alcohol or a sugar as a seed crystal, solidifying the solution or dispersion to form a colloidal solid, stabilizing the colloidal solid by crystallization, optionally drying the stablized solid, and pulverizing it to a particle size smaller than 20 mesh.

12 Claims, No Drawings

FOOD ADDITIVE COMPOSITION AND PROCESS FOR PREPARATION THEREOF

This invention relates to a food additive composition comprising a colloidal solid prepared from a sugar alcohol, a sugar, a food-grade surface-active agent and an edible oil or fat, and to a process for preparing such a composition.

In the production of foodstuffs, surface-active agents are used for many purposes, for example, as emulsifiers for emulsifying oils in water, wetting agents for improving wettability with water, staling retardants (softners) for bread, foaming agents for sponge cakes, defoamers for food production, and food quality improvers. There are a variety of surface-active agents of various properties, for example, normally liquid, paste-like or solid surfactants, readily water-soluble surfactants, and slightly water-soluble surfactants. The function of a particular surface-active agent is determined almost solely by its HLB value. Surfactants having a higher HLB value have higher hydrophilicity, and those having a lower HLB value have higher oleophilicity.

Application of surface-active agents to food production has encountered difficulties. In fact, some of them do not prove satisfactory in practice in spite of their apparent effect in a laboratory test, and others are inconvenient to use. For example, a glycerin fatty acid ester which is known to have a staling-retarding or softening effect for bread is only very slightly soluble in water, and when directly added, does not exert any significant effect. It is effective only when added in the emulsified state or as finely divided particles. Propylene glycol fatty acid esters, glycerin fatty acid esters, and sucrose fatty acid esters commonly used as a foamer component of sponge cake dough exhibit their effect only when they are in the emulsified state or in the form of fine particles. Sometimes, new effects of very slightly water-soluble surfactants can be discovered when they are added in a readily water-soluble form. An example is found in the application of surfactants to frozen fish mince which is produced in great quantities as a raw material for pasted seafood products. A sparingly water-soluble surfactant such as a glycerin fatty acid ester or propylene glycol fatty acid ester, or a mixture of it with an oil or fat, in the emulsified state exhibits an effect of increasing the whiteness of the fish mince and an effect of preventing its protein spoilage during refrigeration.

The present invention is based on the discovery that a food-grade surface-active agent, either alone or together with an oil or fat, forms a colloidal solid in a dispersing medium consisting of a sugar alcohol and/or a sugar. The present invention makes it possible to render slightly water-soluble or water-insoluble substances readily dispersible or soluble in water, convert liquid surfactants and liquid oils or fats into solid powders, and thus to greatly broaden the area of utilization of surfactants for food production.

The sugar alcohol may, for example, be sorbitol, mannitol, and maltitol. Examples of the sugar are sucrose, glucose, fructose, lactose, and maltose. Of these, sorbitol and sucrose are especially preferred.

Useful surface-active agents include glycerin fatty acid esters, propylene glycol fatty acid esters, sorbitan fatty acid esters, sucrose fatty acid esters, and lecithin. Preferred fatty acids for preparing these surfactants are, for example, stearic acid, palmitic acid, myristic acid, lauric acid, capric acid, caprylic acid, oleic acid, linolic acid, and linolenic acid. Mixed fatty acids such as cotton seed oil, soybean oil, colza oil, corn oil, safflower oil, palm oil, beef fats, fish oils, and hardened products of these oils or fats, can also be used.

The composition of this invention contain 60 to 99%, preferably 70 to 98%, of the sugar alcohol and/or the sugar, 30 to 0.5%, preferably 15 to 1%, of the surface-active agent, and 30 to 0%, preferably 20 to 0%, of the edible oil or fat.

The composition must form a colloidal solid in which the surfactant, either alone or with the oil or fat, is dissolved or dispersed in the sugar alcohol and/or the sugar as a dispersing medium. If the proportion of the surfactant or oil is larger than the above-specified range, phase inversion occurs, and the surfactant or oil becomes a dispersing medium. As a result, the composition will not be readily soluble in water, and the desired effect cannot be achieved. When the surfactant is hydrophilic, it tends to dissolve in the dispersing medium, but does not impair the good solubility of the dispersing medium.

The composition of this invention can be produced, for example, by (1) a process which comprises heat-melting the sugar alcohol and/or sugar, adding the surfactant either alone or together with the oil or fat to the melt, stirring the mixture to dissolve or disperse it, cooling the resulting solution or dispersion to solidify it to a colloidal solid, stabilizing it by crystallization, and then pulverizing the stabilized colloidal solid to a powder with a size smaller than 20 mesh; (2) a process which comprises adding the surfactant either alone or together with the oil or fat to an aqueous solution of the sugar alcohol and/or the sugar, stirring the mixture to form a solution or dispersion, evaporating it by heating it under reduced pressure while the sugar alcohol and/or the sugar is maintained in the dissolved or molten state, cooling it to solidify it to a colloidal solid, and then treating it in the same way as in the method (1) above to form a powder having a size smaller than 20 mesh. In these methods, a suitable amount, for example 3 to 30%, of a seed crystal such as a sugar alcohol and/or a sugar can be added to promote crystallization, before the mixture is solidified. When the sugar alcohol and/or sugar is used as the seed crystal, the amount of the starting sugar alcohol and/or sugar needs to be decreased correspondingly.

In one preferred embodiment of the present invention, the surfactant either alone or together with the oil or fat is added to an aqueous solution (preferably in a concentration of at least 50%) of the sugar alcohol and/or the sugar and stirred to form a solution or dispersion, after which a powder of sugar alcohol and/or sugar is added as a seed crystal and mixed with the solution or dispersion, and then the mixture is powdered and dried (or the mixture is dried and then powdered) to form a powder having a size smaller than 20 mesh. If the aqueous solution of sugar alcohol and/or sugar has a high concentration, it may be heated. The drying can be performed by usual methods such as vacuum drying or hot air drying.

The colloidal solid obtained by the process of this invention can also be used as a seed crystal.

For the production of a good quality colloidal solid, an organic solvent such as glycerin, propylene glycol or ethanol may be added before or after the addition of the surfactant.

When the composition of this invention so obtained is put into water, the sugar alcohol and/or the sugar easily dissolves in it, and the surfactant disperses in the form of fine particles (if it is very slightly soluble in water), or dissolves rapidly (if it is water-soluble). At the same time, the oil or fat disperses as fine particles. This phenomenon is ascribable to the fact that the composition forms a colloidal solid in which the readily water-soluble sugar alcohol and/or sugar acts as a dispersing medium. If, on the other hand, the dispersing medium is the surfactant or oil, no such phenomenon occurs.

Unless a substance which can be readily solidified, such as the sugar alcohol or sugar, is used, it is extremely difficult to form a colloidal solid of the present invention. Substances which can readily precipitate as crystals from solution (e.g., sodium chloride), and substances which crystallize on cooling even after heating cannot be used as a dispersing medium for the composition of this invention. It is sometimes convenient therefore to use those sugar alcohols or sugars which contain traces of impurities and are thus difficult to crystallize.

A composition which has the same constituents and proportions as the composition of this invention but is obtained by merely mixing the constituents cannot be a colloidal solid. Even when such a mixture is put into water, the unique effects of the colloidal solid of this invention cannot be obtained.

The particle size of the composition of this invention is smaller than 20 mesh. This particle size is necessary in order to dissolve it rapidly in water or raw materials for food products and achieve the desired effects. For example, in the production of frozen fish mince, the composition is required to disperse or dissolve rapidly and uniformly on mixing at a temperature of about 10° C. for 5 to 15 minutes. When the composition is used for foaming sponge cakes, it is necessary to cause foaming within a period of 5 minutes. If the particle size of the composition is larger, it is time-consuming to dissolve or disperse the composition, and the effect of the surfactant cannot be fully exhibited.

The composition of this invention can be utilized in a very wide range of applications by varying the type or proportion of the surfactant according to the type of food to which the composition is to be added. For example, by using stearic acid monoglyceride, the composition can be used as a softener for bread. When propylene glycol stearate or sucrose monostearate is used, the composition of this invention can be used as a foamer for sponge cakes. If containing sorbitan trioleate, the composition can be used as an effective defoamer. The use of a monoglyceride derived from a cotton seed oil, or a mixture of propylene glycol oleate and a normally liquid oil such as cotton seed oil or soybean oil can afford a composition which has an effect of increasing the whiteness of frozen fish mince and preventing spoilage during refrigeration.

Capric acid, caprylic acid, lauric acid, oleic acid, linoleic acid and linolenic acid have an antimicrobial activity, and glycerin fatty acid esters, propylene glycol fatty acid esters and sucrose fatty acid esters derived from these fatty acids also have an antimicrobial effect. Compositions of this invention prepared by using them as surfactants can be used in applications which require antimicrobial activity.

Being a solid powder, the composition of this invention is far more convenient to handle than liquid or paste-like compositions. In addition, those surfactants which have had only limited use because of being liquid or paste-like can be converted to solid powders if they are used as components of the composition of this invention.

The following non-limitative Examples illustrate the present invention in more detail.

EXAMPLE 1

Sorbitol powder (800 g) was heat-melted at 95° C. Separately, 50 g of propylene glycol stearate, 10 g of sucrose stearate (HLB=15), and 40 g of cotton seed oil were mixed and heated. The mixture was added to the molten sorbitol, and stirred by a homomixer to form an emulsion. Then, 100 g of sorbitol powder as a seed crystal was mixed with the emulsifier. The mixture was cooled to room temperature to form a solid. It was crystallized by being left to stand for 1 day to afford a stable colloidal solid. The resulting colloidal solid was pulverized by a pulverizer and passed through a 20-mesh screen. The final product contained 90% of sorbitol, 5% of propylene glycol stearate, 1% of sucrose stearate, and 4% of cotton seed oil.

EXAMPLE 2

Sorbitol (780 g) was heat-melted at 95° C., and 20 g of high purity lecithin was dissolved in it. Then, 100 g of colza oil was added, and they were stirred by a homomixer to form an emulsion. The emulsion was cooled to 75° C., and 100 g of sorbitol powder as a seed crystal was added. They were uniformly mixed, and allowed to stand for one day at room temperature to solidify and crystallize the mixture. The solid product was pulverized and passed through a 24-mesh screen to give a final product.

EXAMPLE 3

Sorbitol (830 g) was heat-melted at 95° C. On the other hand, 20 g of soybean oil and 30 g of a monoglyceride of hardened soybean oil were mixed, and heated to 80° C. to form a uniform solution. The solution was added to the molten sorbitol, and stirred by a homomixer to form an emulsion. The emulsion was cooled to 75° C., and 120 g of sorbitol powder as a seed crystal was added. They were mixed, homogenized, and allowed to stand for one day at room temperature to solidify and crystallize the mixture. The product was pulverized and passed through a 24-mesh screen to give a final product.

EXAMPLE 4

Sorbitol (630 g) was heat-melted at 95° C., and 20 g of sucrose stearate (HLB=15) was dissolved in it, followed by addition of 300 g of cotton seed oil. They were stirred by a homomixer to form a uniform emulsion. The emulsion was cooled to 75° C., and 50 g of sorbitol powder was added as a seed crystal. They were uniformly mixed, cooled to room temperature, and allowed to stand for one day to solidify and crystallize the mixture. The product was pulverized and passed through a 32-mesh screen to give a final product.

EXAMPLE 5

Sorbitol (850 g) was heat-melted at 95° C., and 25 g of sucrose stearate (HLB=15) was dissolved in it. Then, 25 g of cotton seed oil heated to about 80° C. was added. They were stirred by a homomixer to form an emulsion. The emulsion was cooled to 70° C., and a mixture of 100 g of sorbitol powder, 20 g of sodium pyrophosphate and 20 g of sodium polyphosphate was added as a seed crystal. The mixture was cooled to room temperature, and allowed to stand for one day to crystallize the mixture. The product was pulverized, and passed through a 32-mesh screen to give a final product.

EXAMPLE 6

Water was added to 830 g of sucrose, and the mixture was heated at 90° C. to form a 70% aqueous solution of sucrose. To the solution was added 10 g of sucrose stearate (HLB=15). Then, 30 g of a monoglyceride of hardened soybean oil and 20 g of cotton seed oil were added. The mixture was heated at about 80° C., and added to the aqueous solution of sucrose. The mixture was emulsified by stirring in a homomixer. The emulsion was concentrated to about 85% by heating, and cooled to 80° C. As a seed crystal, 110 g of sucrose powder was added, and the mixture was cooled to room temperature and then dried under reduced pressure. The product was pulverized, and passed through a 24-mesh screen to give a final product.

EXAMPLE 7

Sorbitol (850 g) was heat-melted at 95° C., and 5 g of sucrose palmitate (HLB=15) was dissolved in it. A separately prepared mixture heated at 80° C. and consisting of 25 g of sorbitan fatty acid ester (Span-60, a product of Atlas Powder Co.) and 20 g of cotton seed oil was added to the molten sorbitol. The mixture was stirred by a homomixer to emulsify it. The emulsion was cooled to 70° C., and mixed with 100 g of sorbitol powder as a seed crystal. The mixture was allowed to stand at room temperature for one day to crystallize it. The product was pulverized, and passed through a 24-mesh screen to give a final product.

EXAMPLE 8

Sorbitol (850 g) was heat-melted at 95° C., and 5 g of sucrose palmitate (HLB=15) was dissolved in it. A separately prepared mixture heated at 80° 1 C. and consisting of 25 g of sorbitan monostearate and 20 g of cotton seed oil was added to the molten sorbitol. The mixture was stirred by a homomixer to emulsifity it. The emulsion was cooled to 70° C., and mixed with 100 g of sorbitol powder. The mixture was allowed to stand at room temperature for one day to crystallize it. The product was pulverized, and passed through a 24-mesh screen to give a final product.

EXAMPLE 9

A 70% aqueous solution of sorbitol (1000 g) was heated to 95° C., and a heated mixture of 30 g of a monoglyceride of cotton seed oil and 20 g of soybean oil was added. They were stirred by a homomixer to form an emulsion. The emulsion was then heated in a water bath at 90° C. under reduced pressure to remove water. Then, the emulsion was cooled to 75° C., and mixed with 250 g of sorbitol powder as a seed crystal. The mixture was allowed to stand at room temperature for one day to crystallize it. The product was pulverized, and passed through a 24-mesh screen to give a final product.

EXAMPLE 10

Sixty kilograms of minced flesh of fresh Canadian pollack was divided into three lots each weighing 20 kg. To a first lot were added 2% (1.8% as sorbitol) of the product having a particle size of 20 to 145 mesh obtained in Example 1, 0.1% of sodium pyrophosphate, 0.1% of sodium polyphosphate and 4% of sucrose. They were milled for 15 minutes. To a second lot were added 2% of the product having a particle size of 10 to 20 mesh obtained in Example 1, 0.1% of sodium pyrophosphate, 0.1% of sodium polyphosphate and 4% of sucrose, and they were likewise milled for 15 minutes (comparison). As a comparison, 1.8% of sorbitol, 0.1% of sodium pyrophosphate, 0.1% of sodium polyphosphate and 4% of sucrose were added to a third lot, and milled likewise for 15 minutes.

A sample weighing 1 kg was collected from each of the mixtures, and used for testing quality (Hunter whiteness) before freezing. The remainder were frozen to produce frozen fish mince. Two months after the initiation of freezing, samples were taken from the frozen products, and their Hunter's whiteness was determined. The pH, water content and Hunter whiteness of the fish mince were determined, and shown in Table 1.

Table 1

| Additive composition | Water content (%) | pH | Hunter whiteness Before freezing | Hunter whiteness After 2 months freezing |
|---|---|---|---|---|
| 20-145 mesh product obtained in Example 1 (invention) | 78.3 | 7.43 | 25.8 | 25.6 |
| 10-20 mesh product obtained in Example 1 (comparison) | 78.5 | 7.42 | 23.4 | 23.7 |
| Sorbitol (comparison) | 78.8 | 7.42 | 23.0 | 23.2 |

Table 1 shows that the fish mince mixed with the product of the invention had far superior whiteness to those in the comparison runs. Since the 10-20 mesh product did not completely dissolve in the fish mince, spots were seen to occur in the mince and consequently, its whiteness did not increase.

"Kamaboko" (boiled fish mince paste) was produced from the samples obtained after the two months' freezing. Its Hunter whiteness was measured, and its elasticity was examined by a sensory test. The results are shown in Table 2.

Table 2

| Additive composition | Hunter whiteness | Elasticity |
|---|---|---|
| 20-145 mesh product obtained in Example 1 (invention) | 44.8 | Good |
| 10-20 mesh product obtained in Example 1 (comparison) | 44.7 | Fair |
| Sorbitol (comparison) | 41.2 | Fair |

Table 2 shows that an improvement in whiteness and elasticity was achieved to a greater degree in the lots mixed with the 10-20 mesh product and the 20-145 mesh product than in the lot mixed with sorbitol. The 10-20 mesh product (comparison) apparently showed good results because the coarse particles of 10-20 mesh were dispersed in the fish mince during the milling operation at the time of Kamaboko production. In any case, the product of this comparison was inferior to the 20-145 mesh product of the invention in regard to dispersibility and solubility.

In the test for Hunter whiteness, a color differential meter was used.

The Kamaboko production was performed by a usual method except that the amount of common salt was changed to 2.5%, the amount of starch was reduced to 5%, and the heating conditions were changed to 90° C., 30 minutes.

EXAMPLE 11

Sorbitol (775 g) was heat-melted at 95° C. To the molten sorbitol were added 100 g of sucrose palmitate (HLB=15) and 75 g of propylene glycol, and they were stirred by a homomixer to a uniform mixture. Then, 50 g of sorbitol powder wad added as a seed crystal, and the mixture was cooled, solidified and crystallized. The crystallized product was pulverized to a powder having a size of 24 mesh under.

EXAMPLE 12

Sorbitol (750 g) was heat-melted at 95° C. Then, 50 g of polyoxyethylene sorbitan monolaurate was added. They were stirred to form a homogeneous mixture. As a seed crystal, 200 g of sorbitol was added, and mixed. The mixture was cooled, solidified, and crystallized. The crystallized mixture was pulverized to form a powder having a size of 24 mesh under.

EXAMPLE 13

Sorbitol (850 g) was heat-melted at 95° C., and mixed with 100 g of stearic acid monoglyceride (purified by distillation) and 10 g of glycerin. They were stirred to form a uniform mixture. As a seed crystal, 40 g of sorbitol powder was added. They were mixed, cooled, solidified, crystallized, and pulverized to form a powder having a size of 35 mesh under.

EXAMPLE 14

Sorbitol (800 g) was heat-melted at 97° C., and 100 g of sorbitan trioleate was added. They were stirred to form a uniform mixture. As a seed crystal, 100 g of sorbitol powder was added to the mixture. The resulting mixture was cooled, solidified, crystallized, and pulverized to form a powder having a size of 35 mesh under.

EXAMPLE 15

Sorbitol (800 g) was heat-melted at 95° C., and 100 g of caprylic acid monoglyceride was added. They were stirred to form a uniform mixture. As a seed crystal, 100 g of sorbitol was added. They were mixed, cooled, solidified, and crystallized. The crystallized mixture was pulverized to form a powder having a size of 35 mesh under.

EXAMPLE 16

Sorbitol (900 g) was heat-melted at 95° C., and mixed with a separately prepared heat-melted mixture of 58 g of propylene glycol monostearate and 42 g of a monoglyceride (purified by distillation) of hardened soybean oil. They were stirred by a homomixer to form a uniform mixture. The mixture was cooled, solidified, and allowed to stand at room temperature for one day to crystallize it. The crystallized mixture was pulverized to form a powder having a size of 35 mesh under.

EXAMPLE 17

This Example shows the effect of the composition of this invention in the production of sponge cakes.

Whole eggs (200 g), 200 g of sugar, 80 g of water, and 20 g of the product of Example 11 as a foamer were put into a mixer, and mixed for 30 seconds at a low to medium speed. Then, 200 g of wheat flour was added, and mixing was further performed at a low to medium speed. The mixture was whipped by performing the mixing at a high speed for 5 minutes. After the whipping, the density of the resulting dough was examined. The dough was placed in a former, and baked at 180° C. for 40 minutes. The resulting cake was allowed to stand at room temperature for 1 hour, and then its volume was measured.

For comparison, the above procedure was repeated except that a mere mixture of sorbitol, sucrose palmitate and propylene glycol was used as a foamer instead of the product of Example 11; or that no foamer was used.

The results are shown in Table 3. Table 3 shows that the components exhibit a greater effect by adding them in the form of a colloidal solid in accordance with this invention than by adding them as a mere mixture.

Table 3

| Foaming agent | Density of the dough (g/cm$^3$) | Cake obtained | | | |
|---|---|---|---|---|---|
| | | Weight (g) | Volume (cm$^3$) | Porosity (cm$^3$/g) | Density (g/cm$^3$) |
| Product of Example 11 (invention) | 0.44 | 358 | 1490 | 4.16 | 0.24 |
| Mixture of sorbitol/sucrose palmitate/propylene glycol* (comparison) | 0.63 | 357 | 970 | 2.72 | 0.37 |
| None (comparison) | 0.88 | 354 | 750 | 2.12 | 0.47 |

*The amounts of the components were quite the same as those in Example 11.

EXAMPLE 18

In this Example, the composition obtained in Example 13 was applied to bread, and the softening effect of the composition of the invention was confirmed.

Bread was produced under the condition of 700 g wheat flour standard by the sponge-dough method (AACC Method 10-11). The amount of the composition, calculated as the stearic acid monoglyceride, was 0.2% based on the wheat flour.

The bread produced was allowed to stand indoors, and when the temperature of the inside decreased to about 30° C., it was packed in a polyethylene bag. The polyethylene bag was sealed, and allowed to stand indoors at 20° C.

The staling-retarding effect was evaluated by measuring the load, which caused a 2.5 mm strain to a test sample (a 2 cm thick slice), by means of a compressiometer (AACC Method 74-10). The results are shown in Table 4. Larger values obtained show higher hardness which shows a greater degree of staling. The values shown in Table 4 were obtained by measurement on the third day after standing when differences in oxidation appeared most remarkably.

Table 4

| Composition | Volume and weight of bread | Hardness (g/cm$^2$) | |
| --- | --- | --- | --- |
| | | 1st day | 3rd day |
| Composition of Example 13 | 2020 cm$^3$/ 438 g | 10.8 | 14.2 |
| Stearic acid monoglyceride (0.2%)/Sorbitol (0.78%)/ Glycerin (0.02%) | 1990 cm$^3$/ 435 g | 11.0 | 18.2 |
| Not added | 1980 cm$^3$/ 439 g | 12.5 | 19.7 |

Table 4 shows that far better effects can be obtained by adding the components in the form of a colloidal solid in accordance with the present invention than by adding them as a mere mixture.

EXAMPLE 19

Sorbitol (850 g) was heated to 95° C., and 100 g of linolic acid monoglyceride (purified by distillation) was added. They were stirred to form a uniform mixture. As a seed crystal, 50 g of sorbitol powder was added. The mixture was cooled, solidified, crystallized, and then pulverized to form a powder having a size of 35 mesh under.

EXAMPLE 20

In this Example, the composition obtained in Example 19 was added to sausage, and its effect was confirmed.

Pork (1500 g), 1000 g of beef, 1000 g of mutton, 750 g of lard and 750 g of ice water were used as main raw materials, and mixed with 12.5 g of white pepper, 3.5 g of nutmeg, 2.5 g of cinnamon and 12.5 g of sodium glutamate as secondary materials. Furthermore, 60 g of δ-gluconolactone as a pH adjuster and the chemicals shown in Table 5 were added. They were mixed for 10 minutes by a silent cutter. In each run, the mixture was filled into twenty entrails of sheep, dried at 75° C. for 40 minutes, boiled in water at 75° C. for 20 minutes, and allowed to cool to afford 20 packs of sausage.

Two packs of sausage were placed in each of ten sterilized Petri dishes, and preserved at 25° C. The state of spoilage was examined. The results are shown in Table 5.

In this Example, sorbic acid was used as an antiseptic agent. Sorbic acid is effective against molds rather than against bacteria, and on the other hand, linolic acid monoglyceride is more effective against bacteria than against molds. Hence, the conjoint use of sorbic acid with the linolic acid monoglyceride increases the preserving effect.

Table 5

| Composition | pH of sausage | Time (days) of preservation at 25° C. | | | | | |
| --- | --- | --- | --- | --- | --- | --- | --- |
| | | 2 | 4 | 6 | 8 | 10 | 12 |
| Composition obtained in Example 19 (%) Sorbic acid (0.2%) | 5.87 | 0 | 0 | 5 | 9 | 15 | 20 |
| Linolic acid monoglyceride (0.1%) Sorbitol (0.9%) Sorbic acid (0.2%) | 5.88 | 0 | 3 | 10 | 20 | | |
| Not added | 5.91 | 5 | 20 | | | | |

Note
The figures for the preservation date show the number of sausage packs spoiled per 20 packs of sausage tested.

The results of Table 5 show that the colloidal solid in accordance with this invention has an excellent effect.

EXAMPLE 21

A 70% aqueous solution of sorbitol (3572 g) was heated to 70° C., and 120 g of a monoglyceride of cotton seed oil and 80 g of sorbitan monostearate were added. They were stirred by a homomixer to form a uniform dispersion. The dispersion was heated to 95° C. and dehydrated under reduced pressure. As a seed crystal, 1500 g of sorbitol powder was added. The mixture was cooled, solidified, crystallized, and then pulverized to form a powder having a size of 35 mesh under.

EXAMPLE 22

Sixty kilograms of minced flesh of fresh Canadian pollack was divided into three lots each weighing 20 kg. A first lot was mixed with 4.2% (4% as sorbitol) of the composition obtained in Example 21, 4% of sugar, 0.1% of sodium pyrophosphate and 0.1% of sodium polyphosphate for 15 minutes. As a comparison, a second lot was mixed for 15 minutes with 4% of sorbitol, 0.12% of a monoglyceride of cotton seed oil, 0.08% of sorbitan monoleate, 4% of sugar, 0.1% of sodium pyrophosphate, and 0.1% of sodium polyphosphate. In the second lot, the types and amounts of the additive components were the same as in the first lot, but they were added as a mere mixture and not as a solid colloid. A third lot was mixed for 15 minutes with 0.1% of sodium pyrophosphate, 0.1% of sodium polyphosphate, 4% of sorbitol, and 4% of sucrose as a comparison.

The mixtures were each frozen at −22° C., and after one month, melted. Then, the whiteness of each lot was examined.

Packed kamaboko was produced using the frozen mince as a material, and its quality and the antiseptic effect of the additive composition were examined.

Packed kamaboko was produced by mixing the minced flesh with 3% of common salt, 0.6% of δ-gluconolactone (pH adjuster) and 0.2% of potassium sorbate (auxiliary antiseptic) for 15 minutes by a silent cutter. The mixture was packed into plactic tubes, heated for 45 minutes in hot water at 90° C., and rapidly cooled with cold water.

For the sake of reference, packed kamaboko was also prepared from the third lot without adding potassium sorbate.

The results are shown in Table 6. In each test, 20 packs of kamaboko were used in the test, and the figures for the preservation data show the number of packs spoiled per 20 packs tested. The whiteness was measured by a color differential meter.

Table 6

| Test lot | Frozen minced flesh pH | Whiteness | Packed kamaboko pH | Whiteness | 2 | 4 | 6 | 8 | 10 |
|---|---|---|---|---|---|---|---|---|---|
| 1st lot | 7.47 | 26.7 | 6.70 | 45.8 | 0 | 1 | 5 | 11 | 20 |
| 2nd lot | 7.40 | 25.2 | 6.68 | 44.2 | 0 | 8 | 15 | 20 | |
| 3rd lot Potassium sorbate | 7.40 | 24.5 | 6.68 | 43.3 | 0 | 10 | 20 | | |
| lot No addition of potassium sorbate | | | 6.62 | 43.2 | 12 | 20 | | | |

It is seen from the results of Table 6 that the use of the colloidal solid in accordance with this invention produces a marked effect on the whiteness and preservability of frozen fish mince and kamaboko.

What we claim is:

1. A process for dispersing an edible surface active agent in fish mince which consists essentially of preparing a crystallized colloidally solidified, hydrophilic powder having a particle size of minus 20 mesh and comprising 60 to 99% of a dispersing medium which is a member selected from the group consisting of sugar alcohol, sugar and mixtures thereof, 30 to 0.5% of a food-grade surface-active agent and 30 to 0% of a member selected from edible oil or fat, by adding said food-grade surface-active agent and said edible oil or fat to said sugar alcohol, sugar and mixtures in a heated liquid state so as to disperse said surface-active agent, edible oil or fat therein, cooling and solidifying said dispersion to form a colloidal solid, said cooling also crystallizing said colloidal solid, pulverizing the crystallized colloidal solid, and adding said pulverized solid to said fish mince in amounts sufficient to improve the whiteness of fish mince and to prevent spoilage of the fish mince during refrigeration.

2. The process of claim 1 which comprises dispersing said food-grade surface-active agent, edible oil or fat in an aqueous solution of said sugar alcohol, sugar and mixtures, heating the dispersion while maintaining said sugar alcohol, sugar and mixtures in the dissolved state to remove water therefrom, cooling and solidifying the dewatered heated dispersion to form a colloidal solid, said cooling also crystallizing said colloidal solid.

3. The process of claim 1 which comprises dispersing said food-grade surface-active agent, edible oil or fat in said sugar alcohol, sugar and mixtures while maintaining said sugar alcohol, sugar and mixtures in the molten state, cooling and solidifying the heated molten dispersion to form a colloidal solid, said cooling also crystallizing said colloidal solid.

4. The process of claim 1 wherein the sugar alcohol is a member selected from the group consisting of sorbitol, maltitol and mannitol and the sugar is a member selected from the group consisting of sucrose, glucose, fructose, lactose and maltose, and mixtures thereof.

5. The process of claim 1 wherein the food-grade surface-active agent is a member selected from the group consisting of glycerin fatty acid ester, propylene glycol fatty acid ester, sorbitan fatty acid ester, sucrose fatty acid ester, polyoxyethylene sorbitan fatty acid ester, lecithin and mixtures thereof.

6. The process of claim 1 wherein said sugar alcohol, sugar and mixtures comprise 70 to 98% and said food-grade surface-active agent 15 to 1% of said composition.

7. The process of claim 1 wherein a member selected from the group consisting of sugar alcohol, sugar and mixtures thereof of seed crystals is added to said dispersion prior to cooling and solidifying said dispersion.

8. The process of claim 7 wherein the solidification and crystallization is effected at about room temperature over a period of about one day.

9. A composition for dispersing an edible surface-active agent in fish mince, which composition consists essentially of crystallized colloidally solidified, hydrophilic powder having a particle size of minus 20 mesh and containing 60 to 90% of a dispersing medium which is a member selected from the group consisting of sugar alcohol, sugar and mixtures thereof, said sugar alcohol, sugar and mixtures having dispersed therein 30 to 0.5% of a food-grade surface-active agent, said composition being in admixture with fish mince in an amount sufficient to improve the whiteness of the fish mince and to prevent spoilage of the fish mince during refrigeration.

10. The composition of claim 9 wherein the sugar alcohol is a member selected from the group consisting of sorbitol, maltitol and mannitol and the sugar is a member selected from the group consisting of sucrose, glucose, fructose, lactose and maltose, and mixtures thereof.

11. The composition of claim 9 wherein the food-grade surface-active agent is a member selected from the group consisting of glycerin fatty acid ester, propylene glycol fatty acid ester, sorbitan fatty acid ester, sucrose fatty acid ester, polyoxyethylene sorbitan fatty acid ester, lecithin and mixtures thereof.

12. The composition of claim 9 wherein said sugar alcohol, sugar and mixtures comprise 70 to 98% and said food-grade surface-active agent 15 to 1% of said composition.

* * * * *

UNITED STATES PATENT AND TRADEMARK OFFICE
CERTIFICATE OF CORRECTION

PATENT NO. : 4,168,323
DATED : September 18, 1979
INVENTOR(S) : INAMINE, ET AL.

It is certified that error appears in the above-identified patent and that said Letters Patent are hereby corrected as shown below:

On page 1, item [73], delete "KABUSHIKI KAISHA VENO SEIYAKU OYO KENKYUJO" and insert -- KABUSHIKI KAISHA UENO SEIYAKU OYO KENKYUJO --

Signed and Sealed this

Twenty-ninth Day of January 1980

[SEAL]

Attest:

SIDNEY A. DIAMOND

*Attesting Officer*

*Commissioner of Patents and Trademarks*